US00RE49552E

(19) United States
(12) Reissued Patent
Walker et al.

(10) Patent Number: US RE49,552 E
(45) Date of Reissued Patent: Jun. 13, 2023

(54) ROCK CLAW FOR DEMOLITION HAMMER

(71) Applicant: Caterpillar Inc., Peoria, IL (US)

(72) Inventors: Jason R. Walker, Hewitt, TX (US); Jordan R. Beckhusen, McGregor, TX (US)

(73) Assignee: Caterpillar Inc., Peoria, IL (US)

(21) Appl. No.: 17/240,385

(22) Filed: Apr. 26, 2021

Related U.S. Patent Documents

Reissue of:
(64) Patent No.: 10,604,910
Issued: Mar. 31, 2020
Appl. No.: 15/972,317
Filed: May 7, 2018

(51) Int. Cl.

| | |
|---|---|
| ***E02F 3/96*** | (2006.01) |
| ***E01C 23/12*** | (2006.01) |
| ***B25D 17/02*** | (2006.01) |
| ***B25D 17/28*** | (2006.01) |
| ***E02F 5/30*** | (2006.01) |
| ***B25D 17/00*** | (2006.01) |
| ***E02F 9/28*** | (2006.01) |

(52) U.S. Cl.
CPC ..... *B25D 17/00* (2013.01); *B25D 17/02* (2013.01); *B25D 17/28* (2013.01); *E01C 23/124* (2013.01); *E02F 3/966* (2013.01); *E02F 5/305* (2013.01); *E02F 9/2883* (2013.01)

(58) Field of Classification Search
CPC ..... E02F 3/966; E02F 9/2883; E02F 5/305; B25D 17/02; B25D 17/28; B25D 17/00; E01C 23/124
See application file for complete search history.

(56) References Cited

U.S. PATENT DOCUMENTS

| | | | | | |
|---|---|---|---|---|---|
| 3,550,691 | A * | 12/1970 | Peterson | E02F 9/2833 | 172/699 |
| 3,750,761 | A * | 8/1973 | Smith | A01B 15/025 | 172/719 |
| 3,778,112 | A * | 12/1973 | Krekeler | E02F 9/2891 | 299/104 |
| 4,047,312 | A * | 9/1977 | Stepe | E02F 9/02816 | 37/448 |
| 4,056,938 | A * | 11/1977 | Griswold | E02D 17/08 | 405/283 |
| 4,182,057 | A * | 1/1980 | Klett | E02D 9/2825 | 37/448 |
| 4,776,113 | A * | 10/1988 | Bedford | E02F 9/2825 | 172/701.2 |
| 5,992,812 | A * | 11/1999 | Mark | B65D 81/057 | 206/586 |

(Continued)

FOREIGN PATENT DOCUMENTS

| | | |
|---|---|---|
| KR | 200443113 | 1/2009 |
| WO | 2014037781 | 3/2014 |

OTHER PUBLICATIONS

Extended European Search Report issued Oct. 16, 2019 in European Patent Application No. 19166924.1, 7 pages.

*Primary Examiner* — Joseph A Kaufman
(74) *Attorney, Agent, or Firm* — Xsensus LLC

(57) ABSTRACT

A rock claw for attaching to a corner of a demolition hammer, the rock claw including a first wall having a first inner side surface, a second wall having a second inner side surface joined to the first inner side surface along a first intersection, and a third wall having a third inner side surface. The third inner side surface is joined to the first inner side surface along a second intersection and the third inner side surface is joined to the second inner side surface along a third intersection.

26 Claims, 6 Drawing Sheets

(56) References Cited

U.S. PATENT DOCUMENTS

| | | | | |
|---|---|---|---|---|
| 7,628,222 | B2 | 12/2009 | Yoshimura et al. | |
| 8,500,207 | B2 | 8/2013 | Nickels et al. | |
| 9,630,308 | B2 | 4/2017 | Nickels et al. | |
| 2012/0145422 | A1* | 6/2012 | Nickels | E02F 3/966 173/46 |
| 2015/0041168 | A1 | 2/2015 | Dostinov | |
| 2015/0360361 | A1 | 12/2015 | Gunasekaran et al. | |
| 2016/0067857 | A1 | 3/2016 | Moore | |
| 2016/0229044 | A1* | 8/2016 | Jagdale | E02F 3/966 |
| 2019/0375086 | A1* | 12/2019 | Kabiraj | B25D 17/26 |
| 2022/0161407 | A1* | 5/2022 | Moore | B25D 17/20 |
| 2022/0161408 | A1* | 5/2022 | Moore | B25D 17/22 |

* cited by examiner

ROCK CLAW FOR DEMOLITION HAMMER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS REFERENCE TO RELATED APPLICATION*

*This application is a Reissue of U.S. Pat. No. 10,604,910, the entire content and disclosure of which is incorporated herein by reference.*

TECHNICAL FIELD

This disclosure relates generally to demolition hammers, and more specifically to rock claws for demolition hammers.

BACKGROUND

Demolition hammers are used on work sites to break up hard objects such as rocks, concrete, asphalt, frozen ground, or other materials. The demolition hammers may be mounted to machines, such as back hoes and excavators, or may be hand-held. Such demolition hammers may include a pneumatically or hydraulically actuated power cell having an impact system operatively coupled to a tool that extends from the demolition hammer to engage the hard object. The impact system generates repeated, longitudinally directed forces against a proximal end of the tool. The distal end of the tool, extending outside of the housing, may be positioned against the hard object to break it up.

During operation, the hard objects may need to be rearranged or reoriented to better position them for breaking by the demolition hammer. Demolition hammer manufacturers discourage operators from using the tool to rearrange or reorient the hard objects because excessive side forces on the tool may damage the tool, seals, bushings, or other demolition hammer components. As a result, demolition hammer manufacturers may include rock claws on the demolition hammer that are used to push against the hard objects while protecting the demolition hammer housing and tool.

Rock claws are areas on the bottom portion of a demolition hammer that are built-up to absorb the abrasion and wear from frequent pushing and scraping against hard objects. Most manufacturers provide a rock claw by extending an end plate of the demolition hammer out beyond the profile of the housing. The cantilevered portion of the end plate is typically reinforced with other plates and gussets for strength.

After extended use, the end plate must be replaced due to wear on the rock claw portion. Since, however, the end plate is structurally a part of the functioning demolition hammer (i.e. the end plate helps support other portions of demolition hammer housing and power cell), replacing the end plate requires additional care, such as, for example, holding the housing structure square while the end plate is replaced.

In U.S. Pat. No. 8,500,207 to Nickels et al., the demolition hammer includes rock claws that are separate components attached to the external surface of the demolition hammer. The rock claws are welded into place along the side edges of the demolition hammer and include a first portion that extends up the side of the housing to protect the housing side surface and also a second portion that extends along the bottom of the housing to protect the bottom portion of the distal end of the housing and the end plate. The second portion includes a first leg spaced apart from a second leg to provide a recess that allows the rock claw to protect the distal end of the demolition hammer without obstructing the tool that extends from the demolition hammer.

SUMMARY OF THE DISCLOSURE

According to certain aspects of this disclosure, a rock claw for attaching to a corner of a demolition hammer includes a first wall having a first inner side surface, a second wall having a second inner side surface joined to the first inner side surface along a first intersection, and a third wall having a third inner side surface. The third inner side surface is joined to the first inner side surface along a second intersection and the third inner side surface is joined to the second inner side surface along a third intersection.

In another aspect of the disclosure, a demolition hammer includes a housing having first side wall, a second side wall, and a bottom wall, wherein an intersection of the first side wall, the second side wall, and the bottom wall define a corner. The demolition hammer also includes a power cell positioned within the housing, a tool disposed in the power cell and projecting from the housing through an opening in the bottom wall, and a rock claw attached to an external surface of the housing. The rock claw includes a first wall, a second wall joined to the first wall, a third wall joined to both the first wall and the second wall, wherein the first wall covers a portion of the first side wall, the second wall covers a portion of the second side wall, and the third wall cover a portion of the bottom wall.

In another aspect of the disclosure that may be combined with any of these aspects, the rock claw is configured as an attachable component to a fully functional demolition hammer.

In another aspect of the disclosure that may be combined with any of these aspects, the rock claw is may be removed from the demolition hammer without disassembling any portion of the hammer.

BRIEF DESCRIPTION OF THE DRAWINGS

Further features and advantages of the invention will become apparent from the description of embodiments using the accompanying drawings. In the drawings.

DETAILED DESCRIPTION

Figure 1:
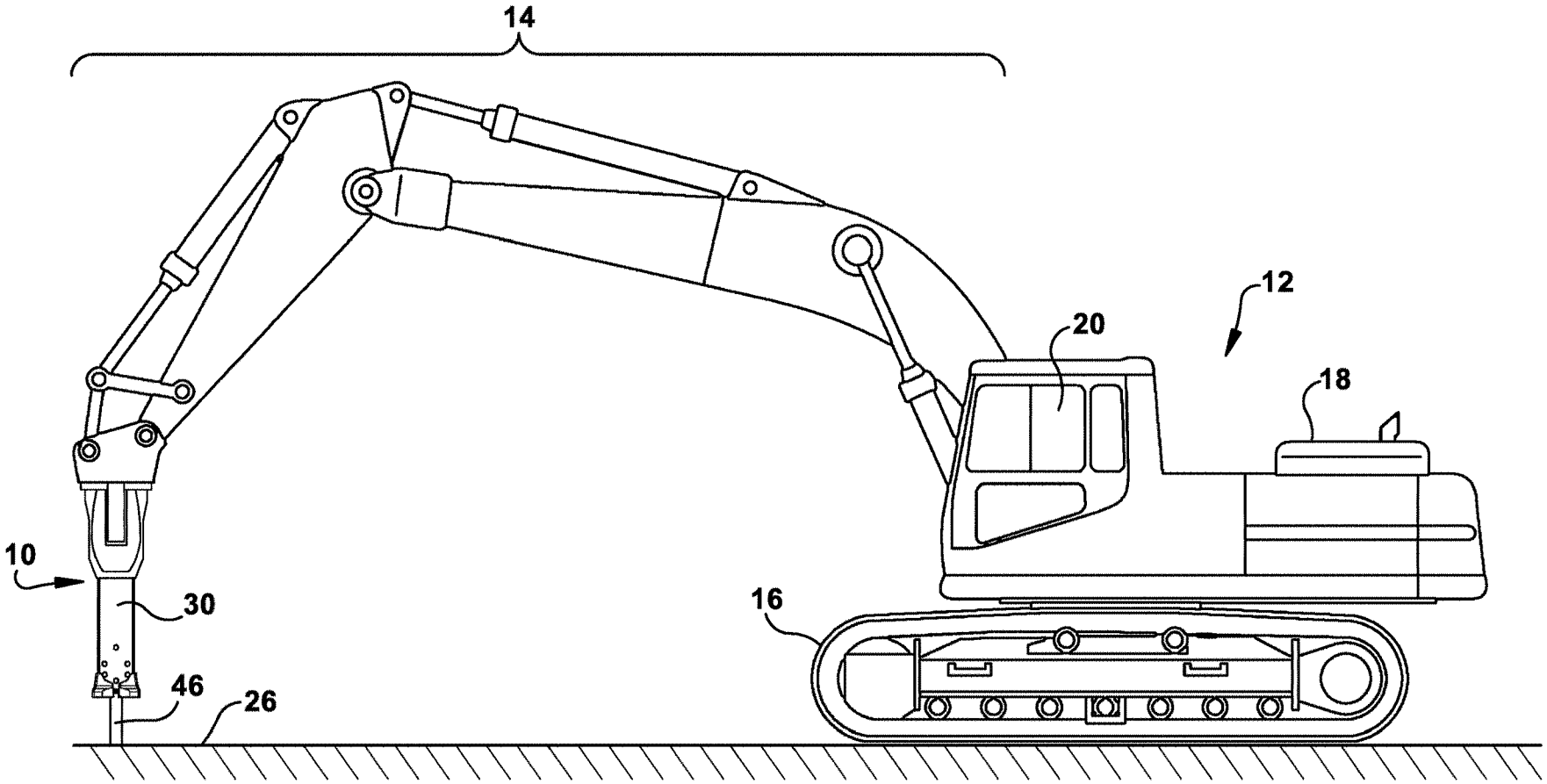
FIG. 1 is a diagrammatic illustration of a machine having a demolition hammer.

Referring to FIG. 1, a demolition hammer 10 is attached to a machine 12. The machine 12 may embody a fixed or mobile machine that performs some type of operation associated with an industry such as mining, construction, farming, transportation, or any other industry known in the art. For example, the machine 12 may be an earth moving machine such as a backhoe, an excavator, a dozer, a loader, a motor grader, or any other earth moving machine. The machine 12 may include an implement system 14 configured to move the demolition hammer 10, a drive system 16 for propelling the machine 12, a power source 18 that provides power to the implement system 14 and the drive system 16, and an operator station 20 for operator control of the implement system 14 and the drive system 16.

The power source 18 may embody an engine such as, for example, a diesel engine, a gasoline engine, a gaseous fuel-powered engine or any other type of combustion engine known in the art. It is contemplated that the power source 18 may alternatively embody a non-combustion source of power such as a fuel cell, a power storage device, or another source known in the art. The power source 18 may produce a mechanical or electrical power output that may then be converted to hydraulic pneumatic power for moving the implement system 14.

Implement system 14 may include a linkage structure acted on by fluid actuators to move the demolition hammer 10. The linkage structure of implement system 14 may be complex, for example, including three or more degrees of freedom. The implement system 14 may carry the demolition hammer 10 for breaking an object or ground surface 26.

The structure and operation of a demolition hammer are briefly described below. Demolition hammers are known in the art, and since it will be apparent to one skilled in the art that the rock claws disclosed may be used with a variety of demolition hammers, a detailed description of all the components and operation of a demolition hammer is not provided.

Figure 2:
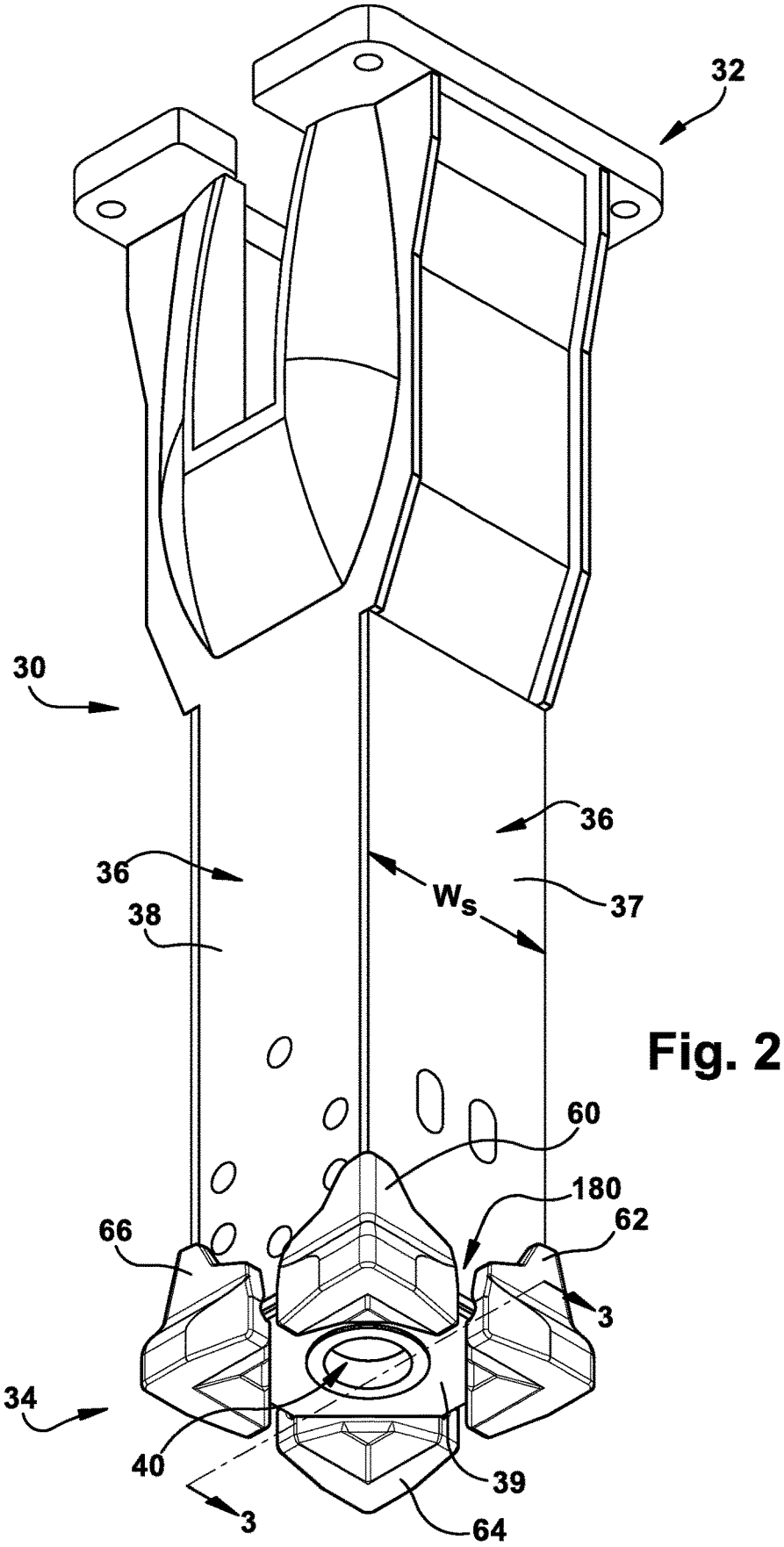
FIG. 2 is a perspective view of an exemplary embodiment of a housing of the demolition hammer of FIG. 1, with exemplary embodiments of rock claws attached.
Figure 3:
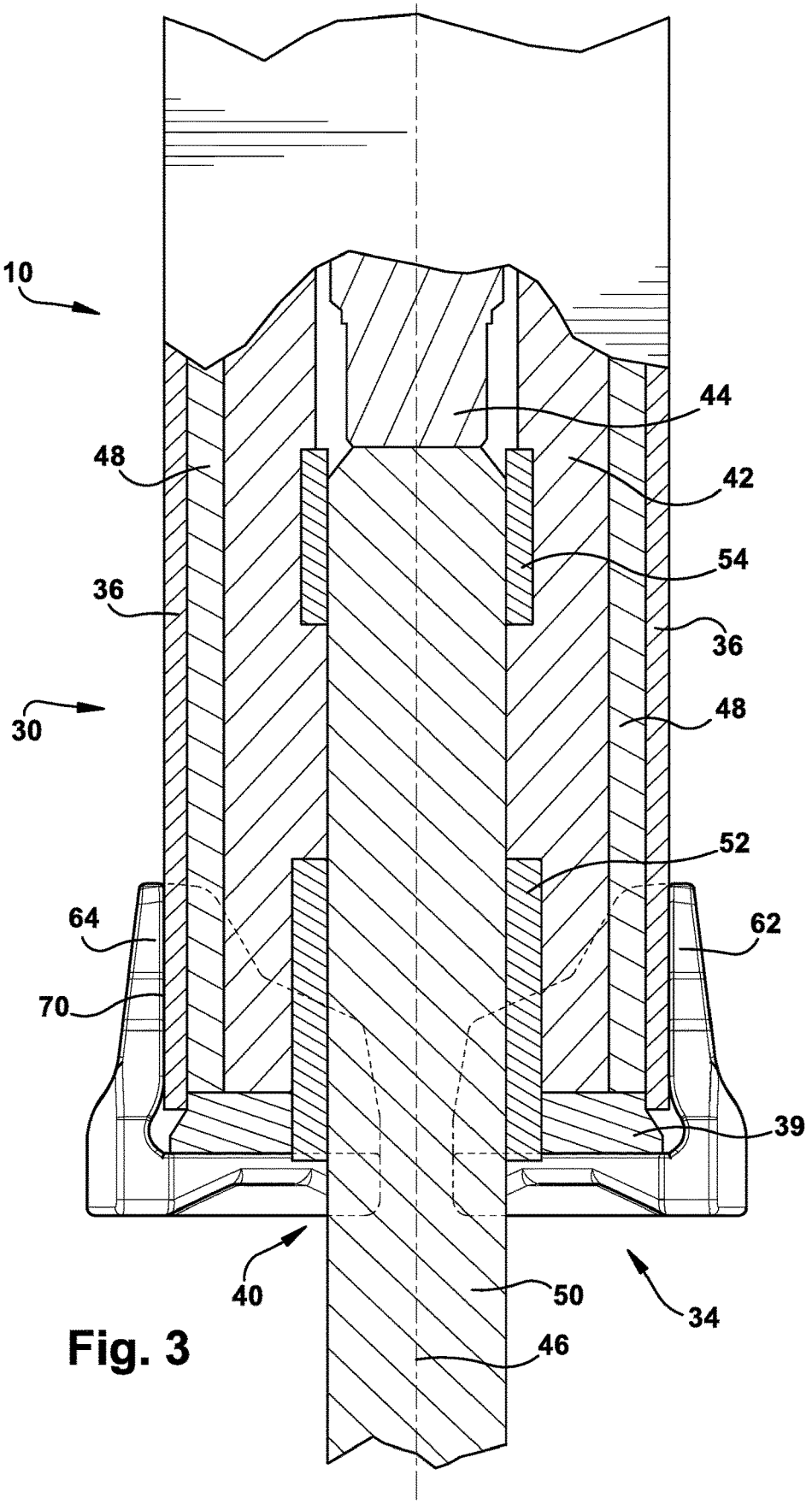
FIG. 3 is a partial cross-sectional view of the distal end of the demolition hammer of FIG. 1

Referring to FIGS. 2 and 3, the demolition hammer 10 includes a housing 30 having a proximal end 32 and a distal end 34. The housing 30 may be formed as a single piece or multiple portions that are welded or otherwise joined together. The distal end 34 of the housing 30 includes a plurality of side walls 36. In the illustrated embodiment, the distal end 34 includes four, parallel side walls 36. In other embodiments, however, the distal end 34 may include more or less than four side walls and/or the plurality of side walls may not be parallel. Referring to FIG. 2, the plurality of side walls 36 includes a first side wall 37 and a second side wall 38. The first side wall 37 has a width Ws.

An end wall 39, such as a removable end plate, defining an opening 40, is attached to the distal end 34 of the housing 30. The intersection of two adjacent side walls 36 and the end wall 39 forms a bottom corner 41 (illustrated by dashed lines in FIG. 9) of the demolition hammer 10. For example, the intersection of the first side wall 37, the second side wall 38, and the end wall 39 forms a bottom corner 41. In the depicted embodiment, the demolition hammer 10 includes four bottom corners 41.

A power cell 42 is disposed inside the housing 30. The power cell 42 includes several internal components of the demolition hammer 10. As shown in FIG. 3, the power cell 42 provides an impact assembly that includes a piston 44. The piston 44 is operatively positioned within the power cell 42 to move along an axis 46. Wear plates 48 are interposed between the power cell 42 and the housing side walls 36. A distal portion of the power cell 42 includes a tool 50 that is operatively positioned to move along the axis 46. A lower bushing 52 and an upper bushing 54 are positioned in the power cell 42 for guiding the tool 50 during operation of the demolition hammer 10.

The demolition hammer 10 may be powered by any suitable means, such as pneumatically-powered or hydraulically-powered. For example, a hydraulic or pneumatic circuit (not shown) may provide pressurized fluid to drive the piston 44 toward the tool 50 during a work stroke and to return the piston 44 during a return stroke. The hydraulic or pneumatic circuit is not described further, since it will be apparent to one skilled in the art that any suitable hydraulic or pneumatic systems may be used to provide pressurized fluid to the piston 44.

In operation, near the end of the work stroke, the piston 44 strikes the tool 50. The distal end of the tool 50 may be positioned to engage an object or ground surface 26 (FIG. 1). The impact of the piston 44 on the tool 50 may cause a shock wave that fractures the hard object (e.g. rock) causing it to break apart.

The demolition hammer 10 further includes a first rock claw 60, a second rock claw 62, a third rock claw 64, and a fourth rock claw 66. In some embodiments, the demolition hammer 10 may include more or less than four rock claws. The rock claws 60, 62, 64, 66 are separate components that are configured to be attached to and removed from exterior surfaces 70 of a fully functional, assembled demolition hammer. For example, in the depicted embodiment, each of the rock claws 60, 62, 64, 66 is attached to separate bottom corners 41 of the demolition hammer 10. The rock claws 60, 62, 64, 66 may be attached to the exterior surfaces 70 by any suitable manner, such as welding, fasteners, or other suitable means. In the disclosed embodiment, the rock claws 60, 62, 64, 66 are attached by welding.

The rock claws 60, 62, 64, 66 may be formed from a variety of materials. Since the rock claws 60, 62, 64, 66 are exposed to abrasive wear from contact with hard objects, the rock claws 60, 62, 64, 66 may be formed from a suitable wear resistant metal, ceramic, composite, or other material. In the depicted embodiment, the rock claws 60, 62, 64, 66 are cast from a wear resistant steel alloy.

The rock claws 60, 62, 64, 66 may be configured in a variety of ways. Any configuration that can be attached to the housing 30 and can be used to engage and move hard objects while adequately protecting the distal end 34 of the housing 30 and the tool 50 from damage during use may be used. In the depicted embodiment, the rock claws 60, 62, 64, 66 are configured identically. Thus, the description of the first rock claw 60 is equally applicable to the second, third and fourth rock claw 62, 64, 66 which are not described further in detail. In other embodiments, however, one or more of the rock claws 60, 62, 64, 66 may be configured differently than another of the rock claws.

Referring to FIGS. 4-9, an exemplary embodiment of the first rock claw 60 is configured to cover one of the bottom corners 41 of the demolition hammer 10 and protect the side walls 36 and the end wall 39 proximate the bottom corner 41. The first rock claw 60 can be configured in a variety of ways. Any configuration that covers one of the bottom corners 41 and suitably protects the sidewalls and/or the end wall proximate the bottom corner 41 from damage by hard objects may be used.

Figure 4:
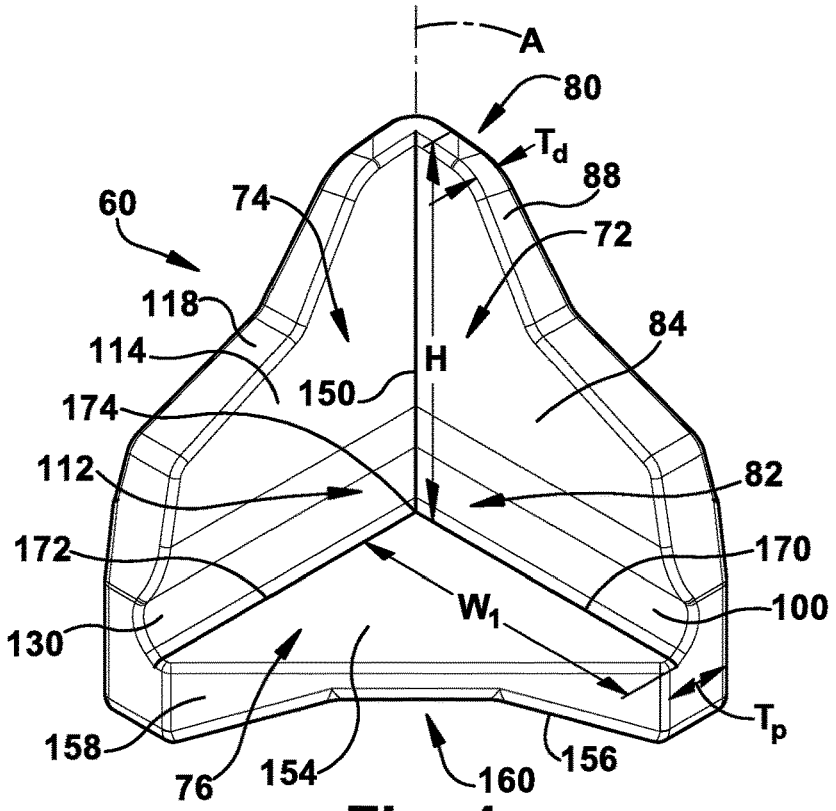
FIG. 4 is first perspective view of the rock claw of FIG. 2.
Figure 5:
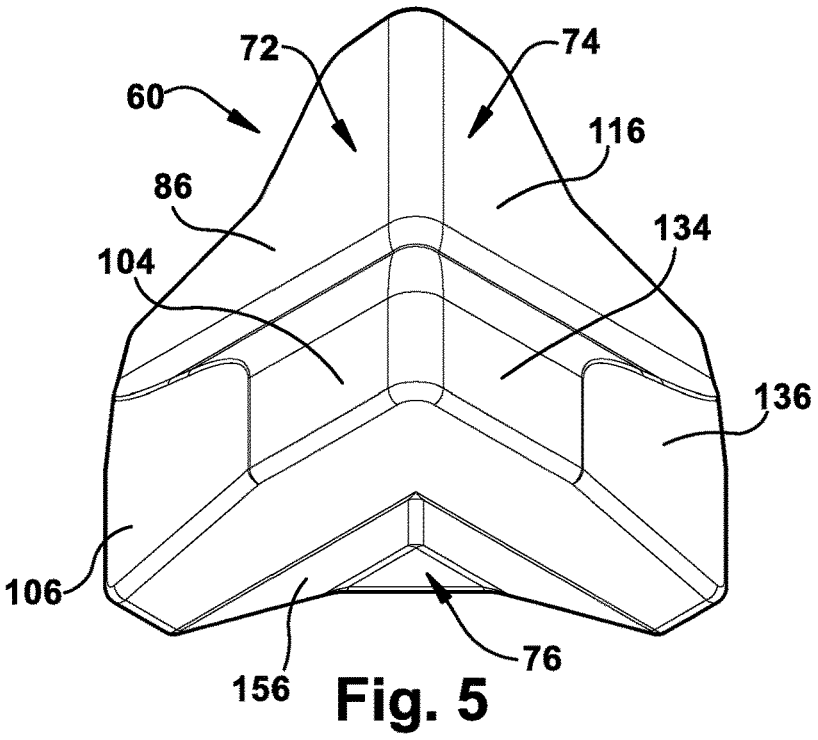
FIG. 5 is second perspective view of the rock claw of FIG. 2.

In the depicted embodiment, the first rock claw 60 includes a first wall 72, a second wall 74, and a third wall 76 extending between the first wall 72 and the second wall 74. The first wall 72 and the second wall 74 intersect along an axis A (FIG. 4). In the depicted embodiment, the first rock claw 60 is symmetric along the axis A. Thus, the first wall 72 is a mirror image of the second wall 74. In other embodiments, however, the first wall 72 may differ from the second wall 74.

The first wall 72 includes a distal portion 80 and a proximal portion 82. The first wall 72 includes an inner face surface 84, an outer face surface 86 opposite the inner face surface 84, and a lateral edge surface 88 extending between the inner face surface 84 and the outer face surface 86. The inner face surface 84 includes a height H1 and a width W1. In the depicted embodiment, the height H1 is maximum adjacent the second wall 74 and the width W1 is maximum adjacent the third wall 76.

The lateral edge surface 88 extends from the distal portion 80 to the proximal portion 82. The lateral edge surface 88 may be configured in a variety of ways, such as for example, different shapes, thicknesses, and contours.

Figure 7:
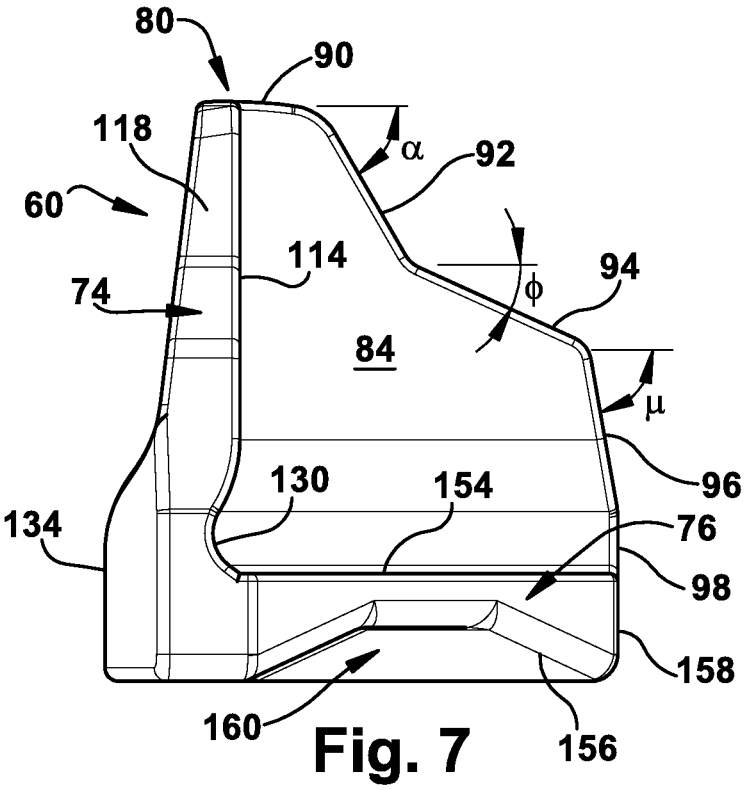
FIG. 7 is a side view of the rock claw of FIG. 2.
Figure 8:
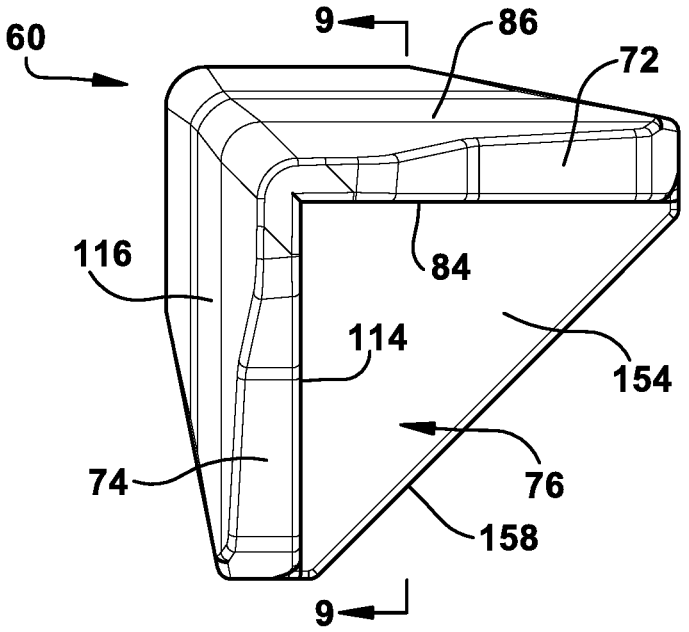
FIG. 8 is a top view of the rock claw of FIG. 2.

Referring to FIG. 7, in the illustrated embodiment, the lateral edge surface 88 includes a first portion 90, a second portion 92, a third portion 94, a fourth portion 96, and a fifth portion 98. The first portion 90 extends parallel to a horizontal plane, as oriented in FIG. 7, or is curved or angled slightly downward toward the third wall 76. The second portion 92 extends downward toward the third wall 76 at an angle $\alpha$. In one exemplary embodiment, the angle $\alpha$ is in the range of 50 degrees to 70 degrees, or 60 degrees.

The third portion 94 extends from the second portion 92 downward toward the third wall 76 at an angle $\Phi$ that is less than the angle $\alpha$. In one exemplary embodiment, the angle $\Phi$ is in the range of 15 degrees to 35 degrees, or 25 degrees. Thus, the second portion 92 and the third portion 94 form a concave outer edge portion of the first wall 72.

The fourth portion 96 extends from the third portion 94 downward toward the third wall 76 at an angle $\mu$ that is greater than the angle $\alpha$. In one exemplary embodiment, the angle $\mu$ is in the range of 70 degrees to 90 degrees, or 80 degrees. The fifth portion 98 extends from the fourth portion 96 downward toward the third wall 76 vertically. In the illustrated embodiment, the first wall 72 has a first thickness Td at the distal portion 80 and a second thickness Tp at the proximal portion 82 which is thicker than the first thickness Td. In one exemplary embodiment the ratio of the second thickness to the first thickness (Tp:Td) is in the range of 2.5 to 4.5, or 3.5.

In the illustrated embodiment, the inner face surface 84 is configured to generally conform to the distal end 34 of the depicted housing 30. For example, the inner face surface 84 may be configured to be parallel to the side wall 36 of the housing 30 when installed thereon. In other embodiments, the inner face surface 84 may not generally conform to the side wall 36 of the housing 30 but still cover at least a portion of the side all 36. In the illustrated embodiment, the inner face surface 84 includes a semicircular recess or groove 100 extending along the width W of the inner face surface 84 adjacent the third wall 76.

Figure 9:
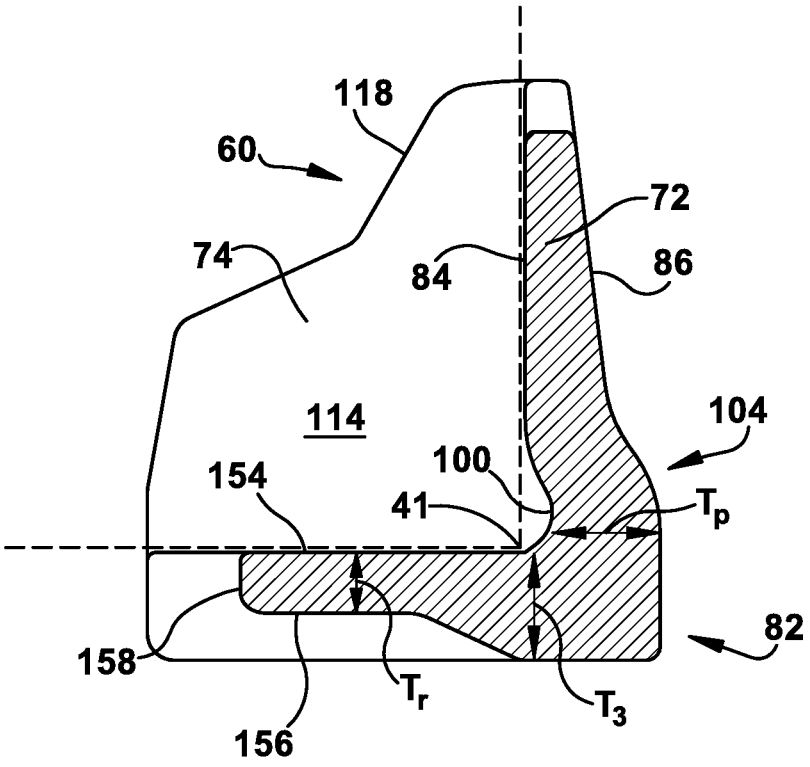
FIG. 9 is a cross section view of the rock claw of FIG. 2, taken along the 9-9 line of FIG. 8.

For a least a portion of the first wall 72, the outer face surface 86 tapers away from the inner face surface 84 in the direction of the proximal portion 82. As shown in FIG. 9, near the proximal portion 82 of the first wall 72, the thickness of the first wall 72 increases to form a protruding region 104. For example, the thickness of the protruding region 104 may be the thickness Tp of the proximal portion 82. The protruding region 104 extends along the width W1 of the inner face surface 84 to form an area of increased thickness extending outward from the outer face surface 86. The protruding region 104 extends along the width W1 from the location where the first wall 72 joins the second wall 74 to the lateral edge surface 88. In the illustrated embodiment, the protruding region 104 begins decreasing in thickness toward the lateral edge surface 88. In the illustrated embodiment, for example, the protruding region 104 begins decreasing in thickness in the range of ¼ to ¾ of the width W1 toward the lateral edge surface 88, or midway along the outer face surface 86 toward the lateral edge surface 88. In the illustrated embodiment, the protruding region 104 includes a tapered region 106 in which the thickness of the protruding region 104 decreases.

As indicated above, in the depicted embodiment, the first wall 72 is a mirror image of the second wall 74. Thus, the description of the first wall 72 applies equally to the second wall 74. As with the first wall 72, the second wall 74 includes a distal portion 110, a proximal portion 112, an inner face surface 114, an outer face surface 116 opposite the inner face surface 114, and a lateral edge surface 118 extending between the inner face surface 114 and the outer face surface 116. The lateral edge surface 118 extends from the distal portion 110 to the proximal portion 112.

The second wall 74 is thicker at the proximal portion 112 than at the distal portion 110, similar to the first wall 72. The inner face surface 114 is configured to generally conform to the distal end 34 of the depicted housing 30. For example, the inner face surface 114 may be configured to be parallel to the side wall 36 of the housing 30 when installed thereon. In the illustrated embodiment, the inner face surface 114 includes a semicircular recess or groove 130 extending along the width of the inner face surface 114 adjacent the third wall 76.

Figure 6:
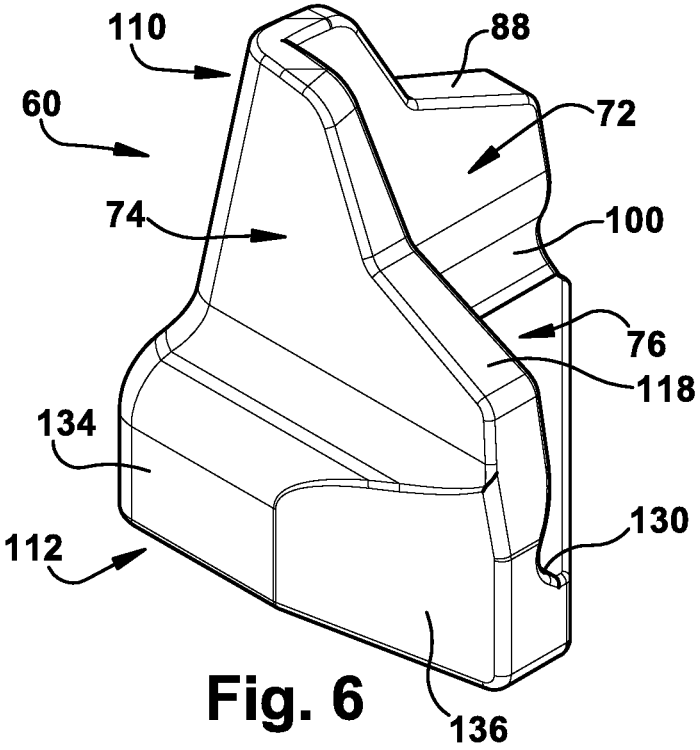
FIG. 6 is a third perspective view of the rock claw of FIG. 2.

For a least a portion of the second wall 74, the outer face surface 116 tapers away from the inner face surface 114 in the direction of the proximal portion 112. As shown in FIG. 6, near the proximal portion 112 of the second wall 74, the thickness of the second wall 74 increases to form a protruding region 134. For example, the thickness of the protruding region 104 may be the thickness Tp of the proximal portion 82. The protruding region 104 extends along the width W1 of the inner face surface 84 to form an area of increased thickness extending outward from the outer face surface 86. The protruding region 104 extends along the width of the second wall 74 from the location where the second wall 74 joins the first wall 72 to the lateral edge surface 118. In the illustrated embodiment, the protruding region 134 begins decreasing in thickness toward the lateral edge surfaces 118. In the illustrated embodiment, for example, the protruding region 134 begins decreasing in thickness in the range of ¼ to ¾ of the width of the second wall 74 toward the lateral edge surface 118, or midway along the outer face surface 116 toward the lateral edge surface 118. In the illustrated embodiment, the protruding region 134 includes a tapered region 136 in which the thickness of the protruding region 134 decreases.

The first wall 72 is joined to the second wall 74, such as for example, by being formed integrally with the second wall 74. The inner face surface 114 of the second wall 74 is joined to the inner face surface 84 of the first wall 72 along a first intersection 150 (FIG. 4). In the illustrated embodiment, the first intersection 150 is linear. In other embodiments, however the first intersection 150 may not be linear.

In the illustrated embodiment, the third wall 76 is triangular. In other embodiments, however, the third wall 76 may be shaped other than triangular. The third wall 76 includes an inner face surface 154, an outer face surface 156 opposite the inner face surface 154, and a lateral edge surface 158 extending between the inner face surface 154 and the outer face surface 156.

In the illustrated embodiment, the inner face surface 154 is planar and the outer face surface 156 includes a recessed portion 160 at a location intermediate or inward from where the third wall 76 joins the first wall 72 and joins the second wall 74. The recessed portion 160 may be configured in a variety of ways. The recessed portion 160 results in the third wall 76 having a thickness Tr at the recessed portion 160 that is less in the thickness T3 of the third wall 76 adjacent where the third wall 76 joins the first wall 72 and/or is less than the thickness of the third wall 76 where the third wall 76 joins the second wall 74.

In other embodiments, however, the inner face surface 154 may be other than planar. The third wall 76 is joined to the first wall 72, such as for example, by being formed integrally with the first wall 72. The third wall 76 is also joined to the second wall 74, such as for example, by being formed integrally with the second wall 74. The inner face surface 154 of the third wall 76 is joined to the inner face surface 84 of the first wall 72 along a second intersection 170 (FIG. 4). In the illustrated embodiment, the second intersection 170 is linear. In other embodiments, however the second intersection 170 may not be linear. Similarly, the inner face surface 154 of the third wall 76 is joined to the inner face surface 114 of the second wall 74 along a third intersection 172 (FIG. 4). In the illustrated embodiment, the third intersection 172 is linear. In other embodiments, however the third intersection 172 may not be linear.

In the illustrated embodiment, the first intersection, the second intersection, and the third intersection intersect at a point to form an inner corner 174. In other embodiments, however, the first intersection 150, the second intersection 170, and the third intersection 172 may not intersect at a single point. In the illustrated embodiment, the inner face surface 154 of the third wall 76 is perpendicular to the inner face surface 84 of the first wall 72 and/or to the inner face surface 114 of the second wall 74. In one embodiment, the each of the inner face surfaces 84, 114, 154 is perpendicular to the other two inner side surfaces.

INDUSTRIAL APPLICABILITY

The present disclosure is applicable to demolition hammers 10. The disclosed rock claws 60, 62, 64, 66 can be attached to a fully functional, assembled demolition hammer 10 to provide protection to the distal end 34 of the demolition hammer 10 such that an operator can use the rock claws to manipulate hard objects, such as boulders, to better position the objects for breaking.

As shown in FIG. 2, each of the rock claws 60, 62, 64, 66 can be attached to a corresponding bottom corner 41 of the demolition hammer 10. For example, the first rock claw 60 can be attached to the exterior surface 70 of the housing 30 to cover the bottom corner 41 formed by the intersection of the first side wall 37, the second side wall 38, and the end wall 39. When installed, the first wall 72 of the first rock claw 60 covers a portion of the first side wall 37, the second wall 74 covers a portion of the second side wall 38, and the third wall 76 cover a portion of the end wall 39. Further, due to the shape of the first wall 72 and the second wall 74, the first rock claw 60 extends further along the height of the first side wall 37 and the second side wall 38 at a location where the first side wall 37 and the second side wall 38 intersect than at a location more central to each of the side walls 37, 38. In the same fashion as the first rock claw 60, the second rock claw 62, the third rock claw 64, and the fourth rock claw 66 can each be attached to the exterior surface 70 of the demolition hammer 10 to cover a corresponding bottom corner 41 of the demolition hammer 10.

Conventional designs for demolition hammers and rock claws placed more wear material, at the distal end of the demolition hammer, along the face of side walls 36 rather than at the corners since it was thought that more wear occurred along the sides of the demolition hammer. Analysis by Applicant, however, shows that more wear occurs at the bottom corners of the demolition hammer, at least in some applications. Thus, the rock claws 60, 62, 64, 66 protect the housing 30, particularly adjacent the bottom corners 41, and also protect the bottom portion of the distal end 34 of the housing 30 and the end wall 39 in the areas most prone to wear. Further, the rock claws 60, 62, 64, 66 protect the distal end 34 of the demolition hammer 10 without obstructing movement of the tool 50 that extends from the demolition hammer 10.

The rock claws 60, 62, 64, 66 may be attached to exterior surface 70 by any suitable means, such as welding. For example, the first rock claw 60 can be positioned against the exterior surface 70 of the housing 30 and welded into place, such as along perimeter of the first rock claw 60, where the inner face surfaces 84, 114, 154 meet the lateral edge surfaces 88, 118, 158, respectively.

As shown in FIG. 2, the width W1 of a first wall 72 of the first rock claw 60 is such that the first rock claw 60 extends along less than half of the width Ws of the first side wall 37 of the housing 30. Thus, two rock claws positioned on two adjacent bottom corners 41 of the housing 30 are spaced apart from the each other such that a gap 180 is formed between the two rock claws. The gap 180 provides convenient access for welding the rock claws to the exterior surface 70. In other embodiments, however, there may not be a gap between two rock claws.

Since the rock claws 60, 62, 64, 66 are separate from and attachable to the demolition hammer 10, when any of the rock claws 60, 62, 64, 66 needs replacing, it can be cut from the exterior surface 70 and replaced without disassembling the demolition hammer 10. Furthermore, in some embodiments, each of the rock claws 60, 62, 64, 66 are symmetric about the axis A. Thus, each of the rock claws 60, 62, 64, 66 is interchangeable with another of the rock claws 60, 62, 64, 66 and each of the rock claws 60, 62, 64, 66 can be attached to any of the bottom corners 41 of the demolition hammer 10.

While the disclosed embodiments have been illustrated and described in detail in the drawings and foregoing description, such illustration and description is to be considered as exemplary and not restrictive in character, it being understood that only certain exemplary embodiments have been shown and described and that all changes and modifications that come within the scope of the disclosure are desired to be protected.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A rock claw for attaching to a corner of a demolition hammer, the rock claw comprising:

a first wall having a first inner side surface;

a second wall having a second inner side surface joined to the first inner side surface along a first intersection; and a third wall having a third inner side surface, the third inner side surface joined to the first inner side surface along a second intersection and the third inner side surface joined to the second inner side surface along a third intersection;

wherein the first wall has a height that is larger adjacent the first intersection than at a location that is more distal from the first intersection.

2. The rock claw of claim 1, wherein the first intersection, the second intersection, and the third intersection meet at a point.

3. The rock claw of claim 1, wherein the third inner side surface is perpendicular to at least one of the first inner side surface and the second inner side surface.

4. The rock claw of claim 1, wherein each of the first inner side surface, the second inner side surface, and the third inner side surface is perpendicular to the other two inner side surfaces.

5. The rock claw of claim 1, wherein the first wall has a first end portion adjacent both the first intersection and the second intersection, and a second end portion opposite the first end portion, wherein the first end portion has a first thickness and the second end portion has a second thickness that is less than the first thickness.

6. The rock claw of claim 5, wherein a ratio of the first thickness to the second thickness is in the range of 2.5 to 4.5.

7. The rock claw of claim 1, wherein the third inner side surface is triangular.

8. The rock claw of claim 1, wherein the rock claw is symmetric along an axis defined by the first intersection.

9. The rock claw of claim 1, wherein the third wall has a first thickness adjacent the first wall, a second thickness adjacent the second wall, and a third thickness intermediate the first wall and second wall, and wherein the third thickness is less than at least one of the first thickness and the second thickness.

10. The rock claw of claim 1, wherein the first inner side surface includes a semicircular recess adjacent the third inner side surface.

11. A demolition hammer, comprising:

a housing having first side wall, a second side wall, and a bottom wall, wherein an intersection of the first side wall, the second side wall, and the bottom wall define a corner;

a power cell positioned within the housing;

a tool disposed in the power cell and projecting from the housing through an opening in the bottom wall; *and* a rock claw attached to an external surface of the housing, the rock claw comprising:

a first wall;

a second wall joined to the first wall; *and* a third wall joined to both the first wall and the second wall[;], wherein the first wall *of the rock claw* covers a portion of the first side wall *of the housing*, the second wall *of the rock claw* covers a portion of the second side wall *of the housing*, and the third wall [cover] *of the rock claw covers* a portion of the bottom wall *of the housing*, and wherein the [housing] first side wall *of the housing* has a height and the first wall of the rock claw extends further along the height of the first side wall *of the housing* at a location adjacent the second side wall *of the housing* than at a location on the first side wall *of the housing* that is more distal from the second side wall *of the housing*.

12. The demolition hammer of claim 11, wherein the first side wall has a width and the first wall of the rock claw extends along less than half of the width of the first side wall.

13. The demolition hammer of claim 11, further comprising:

a third side wall, wherein an intersection of the second side wall, the third side wall, and the bottom wall define a second corner;

a second rock claw attached to an external surface of the housing, the second rock claw comprising:

a first wall a second wall joined to the first wall;

a third wall joined to both the first wall and the second wall;

wherein the first wall of the second rock claw covers a portion of the second side wall, the second wall of the second rock claw covers a portion of the third side wall, and the third wall of the second rock claw cover a portion of the bottom wall.

14. The demolition hammer of claim 13, wherein the second rock claw is interchangeable with the rock claw.

15. The demolition hammer of claim 13, wherein the rock claw is spaced apart from the second rock claw.

16. The demolition hammer of claim 13, further comprising a fourth side wall, wherein an intersection of the third side wall, the fourth side wall, and the bottom wall define a third corner and an intersection of the fourth side wall, the first side wall, and the bottom wall define a fourth corner;

a third rock claw attached to an external surface of the housing, the third rock claw comprising:

a first wall a second wall joined to the first wall;

a third wall joined to both the first wall and the second wall;

wherein the first wall of the third rock claw covers a portion of the third side wall, the second wall of the third rock claw covers a portion of the fourth side wall, and the third wall of the third rock claw cover a portion of the bottom wall; and a fourth rock claw attached to an external surface of the housing, the fourth rock claw comprising:

a first wall a second wall joined to the first wall;

a third wall joined to both the first wall and the second wall;

wherein the first wall of the fourth rock claw covers a portion of the fourth side wall, the second wall of the fourth rock claw covers a portion of the first side wall, and the third wall of the fourth rock claw cover a portion of the bottom wall.

17. The demolition hammer of claim 13, wherein the first wall of the second rock claw has a first end portion adjacent the third wall and a second end portion opposite the first end portion, wherein the first end portion has a first thickness and the second end portion has a second thickness that is less than the first thickness.

18. A rock claw for attaching to a corner of a demolition hammer, the rock claw comprising:

a first wall having a first inner side surface;

a second wall having a second inner side surface joined to the first inner side surface along a first intersection; and a third wall having a third inner side surface, the third inner side surface joined to the first inner side surface along a second intersection and the third inner side surface joined to the second inner side surface along a third intersection, wherein the rock claw is symmetric along an axis defined by the first intersection.

19. The rock claw of claim 18, wherein the third inner side surface is triangular.

*20. The rock claw of claim 1,*

*wherein the first and second inner side surfaces have respective heights from and respective widths along the second intersection and the third intersection,*

*wherein the height of each of the first and second inner side surfaces is maximum adjacent the first intersection and the width of each of the first and second inner side surfaces is maximum adjacent the third wall, and*

*wherein the height of each of the first and second inner side surfaces decreases in a width direction of the first and second walls from the maximum height at the first intersection away from the first intersection.*

*21. The rock claw of claim 1, wherein for each of the first wall and the second wall a first end is at the first intersection and a second end is a free end that is opposite the first end and the first intersection.*

*22. The rock claw of claim 1,*

*wherein the first wall is for covering a portion of a first side wall of a housing of a demolition hammer, the second wall is for covering a portion of a second side wall of the housing of the demolition hammer, and the third wall is for covering a portion of an end wall of the housing of the demolition hammer, and*

*wherein respective shapes of the first and second walls of the rock claw are configured such that the rock claw is for extending further along a height of the first and second side walls of the housing of the demolition hammer at the first intersection then at a location more central to each of the first and second side walls of the housing of the demolition hammer.*

*23. The demolition hammer of claim 11,*

*wherein the first wall of the rock claw has a first inner side surface,*

*wherein the second wall of the rock claw has a second inner side surface joined to the first inner side surface of the first wall along a first intersection,*

*wherein the third wall of the rock claw has a third inner side surface joined to the first inner side surface of the first wall along a second intersection and the second inner side surface of the second wall along a third intersection,*

*wherein the first and second inner side surfaces have respective heights from and respective widths along the second intersection and the third intersection,*

*wherein the height is maximum adjacent the second wall and the width is maximum adjacent the third wall,*

*wherein the height of each of the first and second inner side surfaces is maximum adjacent the first intersection and the width of each of the first and second inner side surfaces is maximum adjacent the third wall, and*

*wherein shapes of the first and second walls of the rock claw are configured such that the rock claw extends further along a height of the first and second side walls of the housing of the demolition hammer at the first intersection than at a location more central to each of the first and second side walls of the housing of the demolition hammer.*

*24. The demolition hammer of claim 11, wherein each of the first wall and the second wall of the rock claw has a free end opposite an intersection at which the second wall is joined to the first wall.*

*25. The rock claw of claim 18,*

*wherein the first and second walls have a height and a width,*

*wherein the height is maximum adjacent the first intersection and the width is maximum adjacent the third wall, and*

*wherein the height decreases in a width direction of the first and second walls from the maximum height at the first intersection away from the first intersection.*

*26. The rock claw of claim 18, wherein each of the first wall and the second wall has a free edge opposite the first intersection.*

* * * * *